United States Patent [19]

Lerner

[11] Patent Number: 5,439,510
[45] Date of Patent: Aug. 8, 1995

[54] HIGH-VELOCITY, HIGH-CAPACITY MIST ELIMINATOR ASSEMBLY AND METHOD

[75] Inventor: Bernard J. Lerner, Pittsburgh, Pa.

[73] Assignee: BECO Engineering Company, Oakmont, Pa.

[21] Appl. No.: 184,662

[22] Filed: Jan. 21, 1994

[51] Int. Cl.⁶ .................................... B01D 46/10
[52] U.S. Cl. ........................ 95/273; 95/211; 55/424; 55/259; 261/DIG. 85
[58] Field of Search .......... 95/211, 273; 96/188, 96/189; 55/424, 259; 261/DIG. 85

[56] References Cited

U.S. PATENT DOCUMENTS

| | | | |
|---|---|---|---|
| 3,134,825 | 5/1964 | Sexton | 55/259 |
| 3,410,057 | 11/1968 | Lerner . | |
| 3,440,018 | 4/1969 | Eckert . | |
| 3,591,947 | 7/1971 | Sexton | 55/259 |
| 4,022,593 | 5/1977 | Lerner | 55/424 |
| 4,218,408 | 8/1980 | Henning et al. | 261/DIG. 85 |
| 4,229,386 | 10/1980 | Lerner | 261/98 |
| 4,459,244 | 7/1984 | Norback | 261/DIG. 85 |
| 4,744,806 | 5/1988 | Ozolins et al. | 95/273 |
| 5,227,095 | 7/1993 | Curtis | 261/DIG. 85 |

FOREIGN PATENT DOCUMENTS

| | | | |
|---|---|---|---|
| 854088 | 10/1952 | Germany | 55/259 |
| 0142151 | 6/1990 | Germany | 55/259 |

*Primary Examiner*—Tim R. Miles
*Attorney, Agent, or Firm*—Ansel M. Schwartz

[57] ABSTRACT

A method and apparatus for maximizing gas flow and liquid loading capacities of filamentary mist eliminators by means of appended impermeable drainage channels or gutters which serve to augment collection of liquid drainage from the mist eliminator, protect the drainage liquid from re-entrainment by gas friction, and transport and discharge the drainage liquid to the low gas velocity region adjacent to the vessel walls.

7 Claims, 2 Drawing Sheets

HIGH-VELOCITY, HIGH-CAPACITY MIST ELIMINATOR ASSEMBLY AND METHOD

FIELD OF THE INVENTION

This invention relates to mist elimination, and in particular, mist elimination by means of filamentary pads or beds of extended surface or filamentary packing elements. This invention also relates to the use of filamentary mist eliminators as liquid-gas contacting means.

BACKGROUND OF THE INVENTION

Industrial filamentary mist eliminators are comprised of pads that are typically fabricated of layered knitted or woven metal or plastic filament mesh. Mist eliminators with filamentary structure may also be fabricated from non-woven fibrous media, such as porous air-laid mat bonded with resins. Mist eliminator beds of conventional tower packing elements, as well as beds of filamentary packing elements, such as those described in Lerner patents are also known to the art.

Knitted-mesh types of mist eliminators are typically woven from four to 11-mil filament diameters and have a capability of removing liquid droplets down to about 5 micrometers in droplet sizes. For finer drop removal, composite materials containing 10 to 50-micron diameter fiberglass or plastic fibers co-knitted with a heavier metal mesh framework are commonly used.

Conventional knitted-mesh mist eliminator pads typically constitute uniform porous media, which tend to retain liquid due to surface tension and counterflow gas-liquid frictional effects. Even at very low mist loadings, a liquid layer tends to builds up in the mesh at the bottom of the pad. This is particularly the case for the smaller mesh pore openings (denser mesh and finer filaments). The liquid layer typically builds to a level which provides enough gravity head to allow equilibrium drainage discharge from the mesh at the same rate mist accumulates within the pad. Frictional effects that retard liquid drainage arise from the fact that the upflowing gas is forced to rise through the same mesh pore channels that the captured liquid mist must use to back drain out of the pad. This competitive flow situation impedes liquid drainage.

Typically, pad thickness for effective mist removal is determined not by the requirement for filtering out the initial mist reaching the pad, but for filtering out the secondary mist generated in the pad by gas bubbling through the retained layer of liquid. This secondary mist is typically designated as re-entrainment. The limit on gas flow capacity of a mist eliminator is generally set by either the flood point or re-entrainment penetration point. For the purpose of this specification, the flood point is defined as that combination of gas and liquid rates at which liquid begins to rapidly accumulate within the pad with a correspondingly rapid rise in gas pressure drop across the mist eliminator. For the purpose of this specification, the re-entrainment penetration point is defined as that point at which spray generated by gas bubbling through the continuous liquid layer within the mist eliminator pad penetrates the upper surface of the pad.

Prior art for increasing the flood point and gas flow capacity of a mist eliminator pad or bed provides preferential liquid discharge paths from the pad.

Ozolins, et al., uses internally structured mesh pads in which there are zones of varied mesh density, while Lerner '593 provides external filamentary drainage rolls acting as appended liquid downspouts. Both means of facilitating liquid discharge from the lower portion of the mist eliminator pad or bed serve to decrease liquid retention in the pad and increase the gas re-entrainment velocity. These prior art mist eliminators thus typically operate at higher gas velocities than do conventional plain pad mist eliminators. However, in both Ozolins '806 and Lerner '593, liquid is discharged in the form of drops or streams directly into the approach gas flow, which is now at higher velocities than can be employed with a conventional pad.

It has now been discovered that the higher ranges of gas velocities achievable using the art of Ozolins or Lerner are high enough to entrain free-falling liquid drops. Additionally, the turbulent flow regime corresponding to the higher gas flow rates generates a maximum gas flow velocity in the central region of the containing vessel. Thus, while facilitated discharge of liquid from the pad serves to increase the gas velocity operating range, the increase in gas rate impedes the free fall of the liquid external to the pad, particularly in the central region of the vessel. Secondary failure of the pads of '593 and '806 has been found to occur by entrainment of the liquid discharge drops and stream external to the mist eliminator by the higher gas velocity approaching the pad. The new limiting flood parameter of pad or bed operation results from refluxing of the liquid back to the pad after it has been discharged from the pad or its appendages. Because the refluxing of liquid drops occurs outside of the pad, this secondary cause of pad flooding is a function of the approach gas velocity, not the internal pore gas velocity.

The prior art of augmenting internal liquid drainage in and from the pad, thereby increasing internal pad gas flood velocities, has thus created a new and undesirable secondary cause of flow limitation. That is, solutions to the problem of facilitating pad liquid release have led to an external problem of re-entrainment of the liquid discharge by the higher allowable gas velocities. A means of augmenting pad liquid drainage, without incurring the creation of the secondary flood mechanism limit external to the pad, is needed to achieve higher pad flow capacities and extend the operating range of filamentary mesh pads and beds.

SUMMARY OF THE INVENTION

It is an object of this invention to provide a method and apparatus for maximizing gas flow and liquid loading capacities of filamentary mist eliminators without creating secondary liquid reflux problems external to the mist eliminator. It is a further object of this invention to provide a mist eliminator having increased gas flow capacity at high liquid loads and methods of fabricating same. It is still a further object of this invention to provide a mist eliminator which can be used as a mass transfer device by irrigation of its extended filamentary surfaces at high liquid and gas rates.

It has now been discovered that gas-quiescent liquid drainage areas at the upstream surfaces of the mist eliminator pads can be created by means of one or more planar drainage troughs placed on, or in close proximity to, the bottom pad surface or its support structure. The flow "shadows" formed in the filamentary pads by such drainage troughs or gutters create unimpeded liquid drainage areas in the pad which are totally shielded from gas friction. Most surprisingly, the drainage troughs serve to increase the limiting gas flow velocities of the mist eliminator despite the blockage of gas flow area by the solid drainage troughs.

Preferably, the appended drainage gutters or channels are so installed as to transport the drainage liquor to, and discharge the liquid into, the low gas flow velocity regions adjacent to the vessel walls. In the novel liquid discharge arrangement of this invention, the liquid draining from the troughs or gutters is discharged into the lowest gas velocity region adjacent to the vessel wall and the pad-external re-entrainment of the discharged liquid streams by high gas rates is avoided.

It would be reasonably expected that the blockage of mist eliminator surface area by the drainage troughs of this invention would cause an increase in point gas velocity in the unblocked bottom areas of the mist eliminator. This higher point gas velocity should logically result in local flooding failure of the pad at lower superficial gas velocities (i.e., velocity based on the total pad surface) than the unblocked pad. However, the opposite has been found to be true. It has been discovered that liquid in the bottom of the pad is sucked into the troughs or the "shadow" zones immediately above the troughs by a Von Karman roll-vortex action and/or vacuum generated behind the troughs by the gas flow around the trough. Thus, even though the point velocity may be raised above the normal unblocked pad gas velocity flood or re-entrainment point, the roll-vortex action downstream of the trough yields significantly higher rates of collection and discharge of liquid from the pad, and greatly reduces the liquid holdup in the pad. This effect appears to more than counterbalance the gas velocity increase in the unblocked pad area, and yields a higher net flood and re-entrainment gas velocity than the pad alone.

In the practice of this invention, the drainage troughs may be affixed to the bottom face of the mist eliminator pad or bed, or to the grid or structure supporting the mist eliminator. In the latter case, it has been determined that the spaced-apart location has little or no effect on the beneficial effect obtained by the use of the drainage troughs. The drainage troughs may be V-shaped, rectangular in cross-section, or cylindrical section in shape. To facilitate drainage and to conduct drainage liquid to the low gas velocity region at the vessel walls, troughs having a concave upwards cross-section are preferred.

The tolerance for high liquid loads achieved by facilitated pad drainage and discharge of the liquid drainage streams to the low gas velocity region adjacent to the vessel walls allows continuous face-spray irrigation of the extended pad filamentary surface area for mass transfer purposes at higher gas rates than have previously been available.

Accordingly, the present invention pertains to a mist eliminator assembly suitable for liquid mist removal from gas plus mist streams. The mist eliminator comprises a filamentary pad or bed disposed in the vessel through which said gas plus mist stream flows substantially in a first direction opposing gravity. The mist eliminator assembly also comprises at least one liquid drainage member placed substantially perpendicular to the gas plus mist stream flow direction adjacent to the pad or bed such that said drainage member captures liquid draining from said pad or bed. The drainage member transports and discharges the liquid away from the pad or bed, thus enhancing the discharge of liquid at high gas velocities without limitation by re-entrainment of said discharge liquid by the gas plus mist stream flow.

The present invention also pertains to a method for removal of mist from a gas plus mist stream. The method comprises the steps of introducing a gas plus mist stream flow into a vessel. Then there is the step of passing the gas plus mist stream flow through a filamentary pad to substantially remove the mist from the gas plus mist stream flow. Next there is the step of collecting the mist which has been removed from the gas plus mist stream flow and at least one drainage member under the filamentary pad collecting the mist as the mist removed from the gas plus mist stream flow by the filamentary pad drips therefrom. Then there is the step of transporting the collected mist in the drainage member to the vicinity of the vessel wall area. Next there is the step of discharging the collected mist in the proximate wall area of the vessel.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
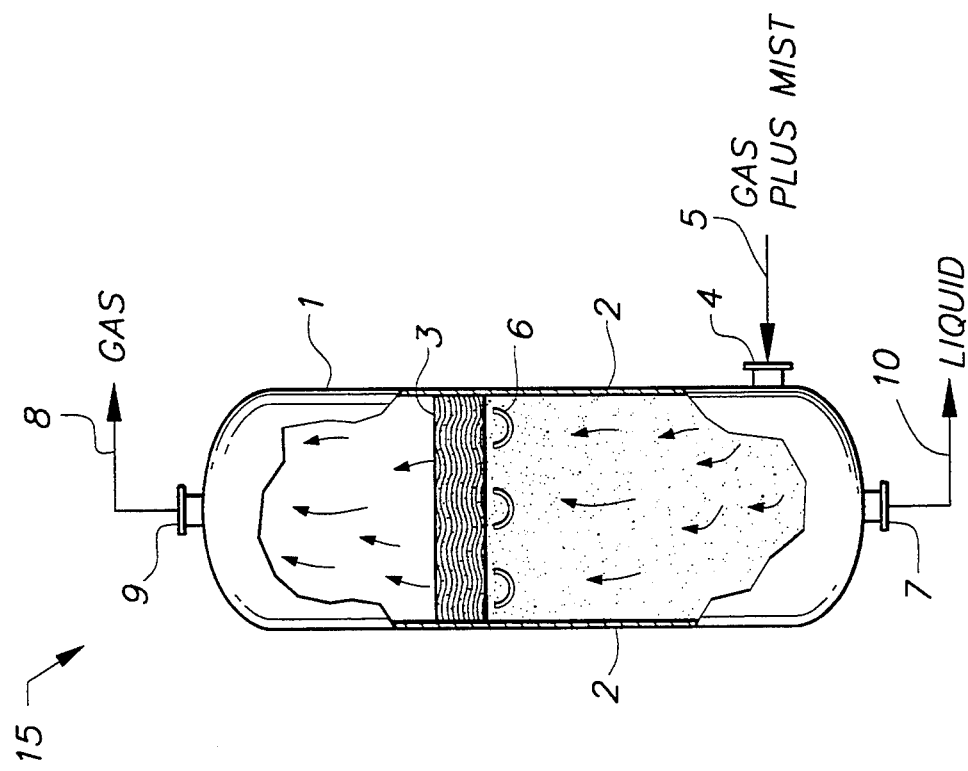
FIG. 1 is a diagrammatic sectional view of a vessel containing an embodiment of the invention, with parts broken away to show details of the apparatus of the invention, showing placement of multiple drainage troughs at the upstream surface of a mist eliminator pad.

Referring now to the drawings wherein like reference numerals refer to similar or identical parts throughout the several views, and more specifically to FIG. 1 thereof, there is shown a mist eliminator assembly 15 suitable for liquid mist removal from gas streams. The mist eliminator assembly 15 comprises a filamentary pad or bed 3 disposed in a vessel 1 through which the gas plus mist stream flows substantially in a first direction opposing gravity. The mist eliminator assembly 15 also comprises at least one liquid drainage member 6 placed substantially perpendicular to the gas plus mist stream flow direction 5 adjacent to the pad or bed 3 such that the drainage member 6 captures liquid 10 draining from the pad or bed 3. The drainage member 6 transports and discharges the liquid 10 away from the pad or bed 6, thus enhancing the discharge of liquid 10 at high gas velocities without limitation by re-entrainment of the discharged liquid 10 by the gas plus mist stream flow 5.

Figure 4:
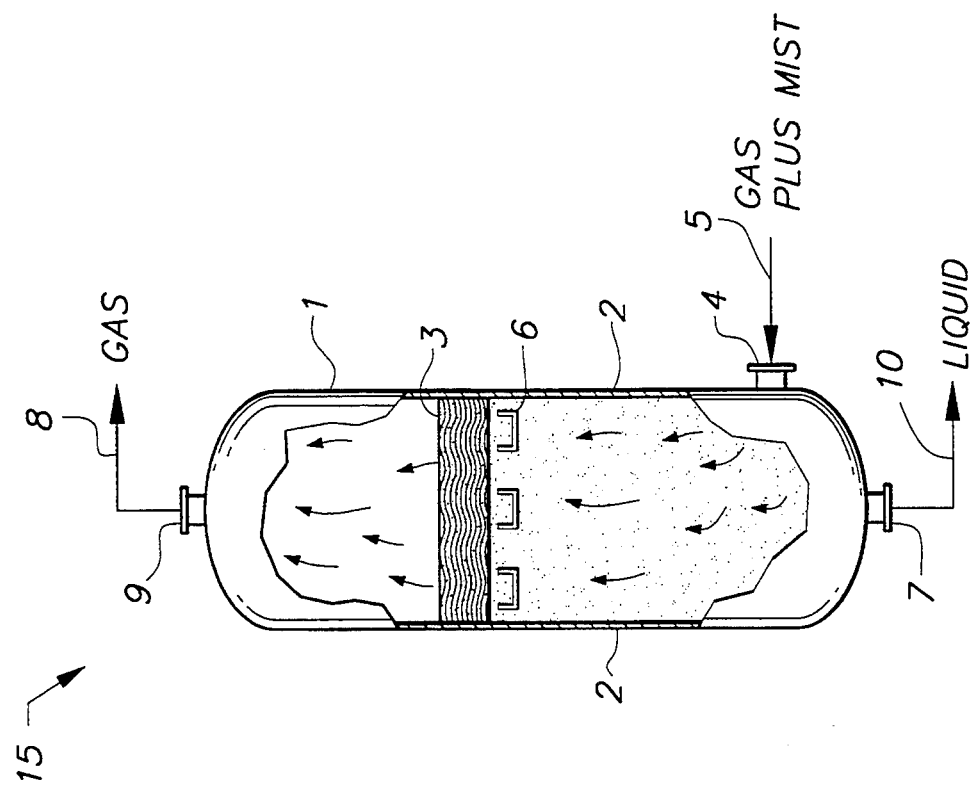
FIG. 4 is a diagrammatic sectional view of a vessel containing another embodiment of the invention.
Figure 3:
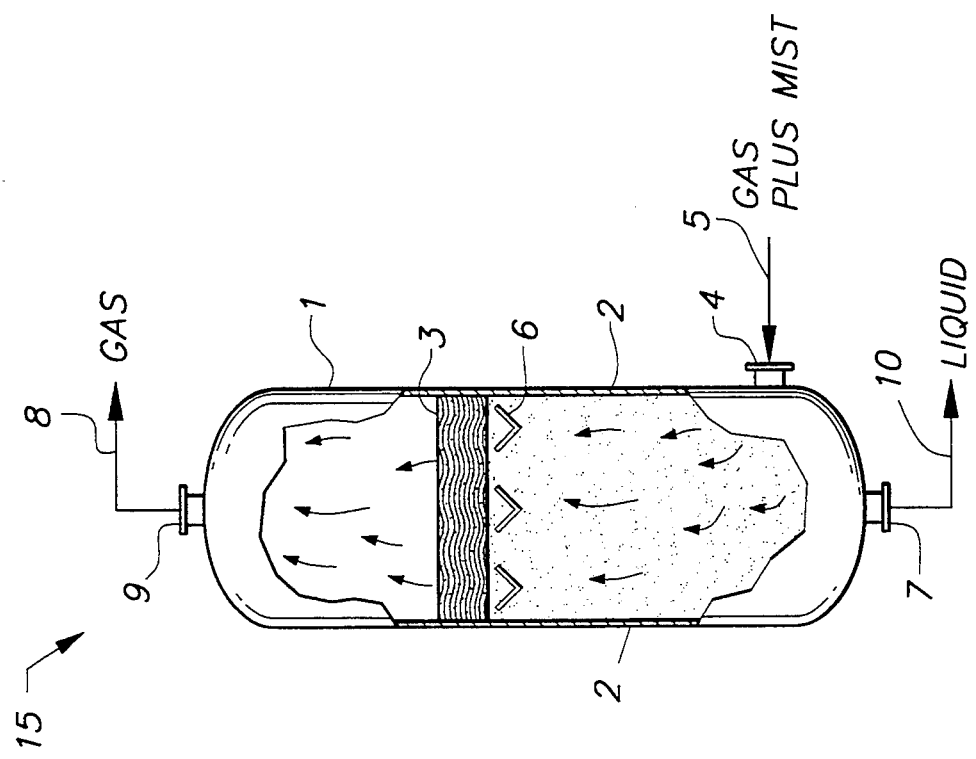
FIG. 3 is a diagrammatic sectional view of a vessel containing another embodiment of the invention.

The drainage member 6 can be a cylindrical cross-section placed concave upward in the vessel 1. Or, the drainage member 6 can be of an angular cross-section, opened upward in the vessel 1 as shown in FIGS. 3 and 4. Preferably, the vessel 1 has walls 2, and the drainage member 6 transports and discharges the liquid 10 proximate to the walls 2 of the vessel 1, whereby the discharged liquid 10 from the assembly 15 is into a gas-quiescent flow region 13. Preferably, the drainage member 6 is impermeable.

The present invention also pertains to a method for removal of mist from a gas plus mist stream comprising the steps of introducing a gas plus mist stream flow 5 into a vessel 1. Then there is the step of passing the gas plus mist stream flow with mist 5 through a filamentary pad 3 to substantially remove the mist 5 from the gas plus mist stream flow. Then there is the step of collecting the mist which has been removed from the gas plus mist stream flow and at least one drainage member 6 under the filamentary pad 3 as the mist removed from the gas plus mist stream flow 5 by the filamentary pad 3 drips therefrom. Next there is the step of transporting the collected mist in the drainage member 6 to the vicinity of the vessel wall area. Next, there is the step of discharging the collected mist in the proximate wall area of the vessel 1.

In the operation of the invention, a cylindrical vessel 1 having walls 2 encloses and supports a filamentary mist eliminator pad 3 having a diameter equal to that of the vessel 1. Vessel 1 contains a lower inlet 4 through which a mist-containing gas 5 flows into the vessel 1. Suspended below the mist eliminator pad 3 are impermeable drainage troughs 6. The mist eliminator pad 2 removes the liquid mist from the gas 5. The liquid collects at the bottom of the filamentary mist eliminator body and drains into the drainage troughs 6. Drainage takes place under the influence of gravity, and in the gas "shadow" zones downstream of the impermeable drainage troughs, liquid drainage is substantially unimpeded by the countervailing force of direct gas friction. Collected liquid 10 is discharged from the drainage troughs 6 to the area close to the walls 2 of the vessel 1 and flows down to the bottom of the vessel and out the bottom drain 7. The de-misted gas 8 exits through the nozzle 9 at the top of the vessel.

Figure 2:
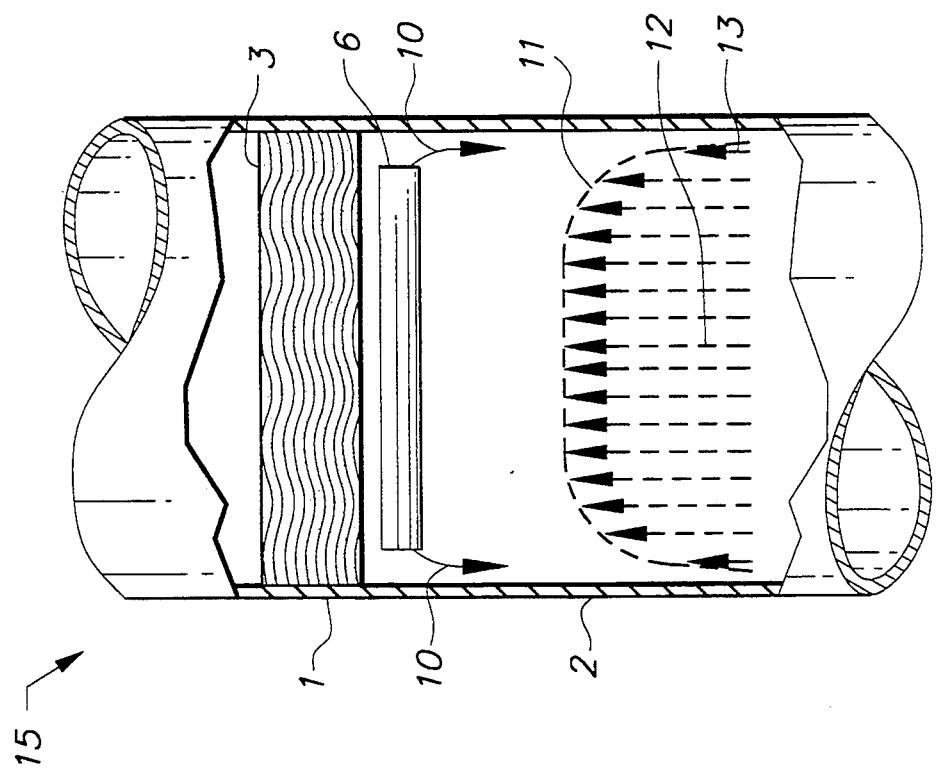
FIG. 2 is an enlarged orthogonal view of the apparatus of the invention shown in FIG. 1, illustrating the discharge of the liquid from the drainage troughs into gas-quiescent flow areas. Also shown in FIG. 2 is a schematic representation of the velocity profile of gas in turbulent flow.

With reference to FIG. 2, which is an enlarged orthogonal view of the apparatus of FIG. 1, collected liquid 10 draining from the impermeable drainage troughs 6 is discharged in the vicinity of the walls 2 of vessel 1. In the gas flow velocity range where mist collection by impingement on filaments is operative, gas flow is in the turbulent range of flow. A schematic representation of a typical gas velocity profile 11 of a gas in turbulent flow in a cylindrical vessel is depicted. The velocity profile 11 indicates the point velocities 12 of a gas in turbulent flow relative to the diameter of the containing vessel. In the cylindrical vessel 1, fully-developed turbulent flow corresponds to a velocity profile 11 where the gas velocity 12 in the central area of the vessel is maximum, and the gas velocity 13 in the boundary layer at the vessel walls 2 is minimum, approaching zero at the wall. This area proximate the wall is therefore a relatively quiescent gas flow region. Discharge of the liquid 10 into the zones next to the vessel walls 2 presents the liquid with minimum upflow gas velocities and gas frictional forces that cause liquid re-entrainment and refluxing.

EXAMPLE I

A series of trials was conducted in a 11.5-inch i.d. clear acrylic column through which air was blown upward through a woven mesh mist eliminator. The test mesh mist eliminator was 4 inches thick, comprised of 23 crimped double layers of 11-mil stainless steel woven mesh, held in top and bottom 1-inch deep frames. The test pad was measured by weighing as having a volumetric density of 8 pounds per cubic foot.

Air was supplied to the acrylic test column by means of a forced draft centrifugal fan, and air velocity was measured by means of a pitot tube located in a 6-inch diameter duct above the test column section. To simulate very high mist loadings, water spray was directed at the mist eliminator at metered liquid rates, concurrent with air flow. Two separate sets of liquid mist loading rate runs were made, using two different spray nozzles. The first series of test runs were made using a Steinen SSM61 nozzle operated at 40 psig at a capacity of 0.6 GPM.

The first series of runs, referred to hereinafter as the Steinen series, was conducted at a spray rate of 0.6 GPM. At 0.6 GPM, the mass mist liquid loading on the pad was 417 pounds per hour per square foot of mesh. The Steinen spray nozzle was located $8\frac{1}{2}$ inches below the mist eliminator pad, so that for the spray angle, the spray coverage was limited to the pad area. Liquid spray rates were metered by means of a rotameter, and were maintained constant at 0.6 GPM during a run. A run was conducted by increasing the air flow in a stepwise manner, measuring pressure drop and air velocity at each step, and visually observing the top of the mist eliminator and the area above it by means of a floodlight positioned alongside the acrylic column. Pressure drop across the mist eliminator pad was measured by means of an inclined manometer. The re-entrainment, or visual flood point, was taken as the point at which liquid drops were visually observed penetrating the top surface of the mist eliminator pad.

An initial reference test run in the Steinen series was made with the pad alone, increasing gas flow stepwise under constant-rate spray irrigation. Liquid re-entrainment was first observed above the pad at 773 feet per minute (fpm) and become massive at 790 fpm, with a rapid pressure drop increase.

In the next test of the Steinen series, a half-tube section of a $3\frac{1}{2}$ inch diameter pipe, $11\frac{1}{4}$ inch long, was affixed to the center of the bottom frame, facing concave upward, spaced 1 inch below the bottom of the mesh. The projected blocked-out mist pad flow area was 37.9% of the total area of the pad. A repeat of the stepwise air increase run gave a re-entrainment velocity range of 934 fpm. This represents a 161 fpm (20.8%) increase in re-entrainment gas velocity, using the drainage trough of this invention. During this run, it was visually observed that the liquid in the bottom of the mesh pad was being sucked into the drainage trough. Close examination revealed that the air flow around the drainage trough, as evidenced by the liquid flow patterns, was in apparent roll or vortex flow in the mesh behind the trough. The air flow pattern caused the liquid to be lifted in the mesh areas around the trough "shadow" and swirled into the shadow area. This unique action resulted in markedly enhanced liquid removal from the bottom of the mesh. This appears to be one, if not the primary, cause of the increase in pad re-entrainment velocity.

Significantly, with almost 38% of the pad area blocked by the drainage trough, the gas velocity in the remaining unblocked area was 38% higher in the drainage trough run than the gas velocity through the pad in the reference run. This difference is reflected in the pad pressure drop at the initial re-entrainment point. For the reference pad run, this was 2.25 inches of water column (W.C.), while for the pad plus drainage trough run, the corresponding pressure drop was 3.00 inches W.C. The 38% increase in gas velocity in the unblocked pad area would normally be expected to radically lower the re-entrainment point. In view of this, the effectiveness of the trough action in increasing the re-entrainment point by more than 20% is even more remarkable. Despite the substantial blockage and restriction of gas flow area, which would tend to raise localized gas velocities through the unblocked liquid-retaining areas of the pad, the re-entrainment flood range gas flow capacity of the mist eliminator was found to be increased significantly.

It was noted in the cylindrical drainage trough run that the liquid discharged from the trough near the walls of the column flowed off the trough in virtually-undisturbed streams, falling in a short arc into contact with the walls. The liquid then spread out on the walls of the column and flowed without disturbance to the drain.

In a third Steinen run, a 2×2 inch angle, $11\frac{1}{4}$ inch long, was substituted for the semi-circular drainage trough. This angle was affixed to the center of the bottom mist eliminator frame, with the apex down, forming an upwardly open drainage gutter. The visual re-entrainment point for this drainage member was found to be 944 fpm, slightly better than that obtained with the semi-circular drainage trough.

In order to compare the effect of the drainage troughs of this invention with the prior art, the mesh pad of the Steinen series was equipped with a drainage member according to the teachings of Lerner, '593. A 3-inch diameter, 11-inch long, drainage roll of 11-mesh of the same construction as the mesh pad was made and fastened to the bottom mesh of the pad. This type of mist eliminator construction is marketed commercially under the trade-mark of "Mist-Master ®". A fourth test run in the Steinen series with this pad/roll combination gave a visual re-entrainment point of 904 fpm, somewhat below the 934 and 944 fpm values obtained in the previous Steinen runs with the impermeable drainage troughs of this invention. Thus, despite area blockage, the impermeable drainage troughs of this invention yield higher mesh eliminator re-entrainment velocities than liquid drainage arrays of the prior art. The summary of these tests is presented in Table I.

In a second series of test runs, designated as the Bete series, spray was generated by means of a Bete Fog Nozzle Company TF8FCN nozzle, operated at 40 psig at rate of 2.6 GPM, placed 6 inches below the bottom of the pad. The results of the Bete series of runs are listed in Table I, along with the results of the Steinen series. Although the impermeable drainage troughs of this invention were found to give an improvement over the reference pad run, the differences for the Bete series were not as marked as those of the Steinen series. It was observed during the Bete runs that the drainage trough was almost filled with liquid, and it was suspected that the drainage capacity of the troughs was limiting the discharge rate from the pad. Accordingly, Test 8 was run with a 2-inch×2-inch angle drainage trough, but with a 1.3 GPM spray rate. The re-entrainment gas velocity at this liquid load was found to be 846 fpm, as compared to the 678 fpm limit at 2.6 GPM. This verified the visual finding that the drainage capacity of the single gutter was the limiting value at the higher liquid loading. This gutter transport rate limitation may be overcome by providing multiple drainage troughs or large troughs.

Relative to a conventional knitted-mesh mist eliminator having a density of 9 pounds per cubic foot, and operating under a water spray load of 417 pounds/hour/square foot of surface, the use of the drainage gutters of this invention increased the re-entrainment air velocity from about 780 fpm to 933–944 fpm. Relative to a pad equipped with a mesh drainage roll of the prior art, the gutters of this invention increased the air re-entrainment velocity from 904 to 933–944 fpm at the 417 pounds/hour/square foot water spray load. These are significant increases in limiting air flow rates over those of a conventional pad and prior art devices. However, it is recognized that these increases in flow ranges are typical of the air-water system used in the trials, and the extent of the increase in operating ranges gained by the use of the drainage members of this invention will be different for liquids having physical properties differing from water, and for gases having densities other than that of ambient air.

Although the drainage members used in the trials were solid, impermeable troughs, it is within the scope of this invention to utilize permeable or semi-permeable materials for drainage troughs, providing that a major part of the liquid draining from the filamentary or mesh pad or bed is conveyed by the troughs to gas-quiescent or low gas velocity zones.

It is known in the art that pads or beds of filamentary construction may be employed as gas-liquid contact means for mass transfer. The facilitated pad drainage and tolerance for high liquid loads of this invention allows continuous face-spray irrigation of the extended pad filamentary surface area for mass transfer purposes at higher rates than have previously been allowable.

It is to be understood that the invention is not limited to the specific illustrative embodiments described and that many other modifications and embodiments within the general spirit of the invention are included within its scope.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

TABLE I

RE-ENTRAINMENT GAS VELOCITIES
(FEET PER MINUTE)
11.5-INCH DIAMETER MIST ELIMINATOR
4-INCH THICK KNITTED MESH

| ARRANGEMENT | RUN NO. | STEINEN SERIES 0.6 GPM | RUN NO. | BETE SERIES 2.6 GPM |
|---|---|---|---|---|
| Pad Only | 1 | 773 | 5 | 628 |
| Pad + 3½" Diameter Half-tube Drain | 2 | 934 | 6 | 671 |
| Pad + 2" × 2" Angle Drain Trough | 3 | 944 | 7 | 678 |
| Pad + 3" Diameter Mesh Drain Roll | 4 | 904 | | |
| | | | | BETE SERIES 1.3 GPM |
| Pad + 2" × 2" Angle Drain Trough | | | 8 | 846 |

What is claimed is:

1. A mist eliminator assembly suitable for liquid mist removal from gas plus mist streams, comprising: a filamentary pad or bed disposed in a vessel through which said gas plus mist stream flows substantially in a first direction opposing gravity, and at least one impermeable liquid drainage member placed substantially perpendicular to the gas plus mist stream flow direction, said drainage member located adjacent to the pad or bed such that said drainage member captures liquid draining from the bottom of said pad or bed, said drainage member extending to the vicinity of the vessel wall, said drainage member transporting and discharging said liquid away from said pad or bed to the vicinity of the walls of said vessel substantially in a second direction following gravity and in parallel with the vessel's vertical axis, whereby the discharge of liquid from said assembly is into a gas-quiescent flow region, thus enhancing the discharge of liquid at high gas velocities without limitation by re-entrainment of said discharged liquid by said gas plus mist stream flow.

2. The apparatus of claim 1 in which the said drainage members are of cylindrical cross-sections placed concave upward.

3. The apparatus of claim 1 in which the drainage members are of angular cross-section, open upward.

4. The apparatus of claim 1 in which the drainage members are of rectangular cross-section, open upward.

5. A method for removal of mist from a gas plus mist stream comprising the steps of:

introducing a gas plus mist stream flow into a vessel substantially in a first direction opposing gravity;

passing the gas plus mist stream flow through a filamentary pad to substantially remove the mist from the gas plus mist stream flow;

collecting the mist which has been removed from the gas plus mist stream flow from the lower surface of the filamentary pad in at least one impermeable drainage member under and adjacent to the filamentary pad as the mist removed from the gas plus mist stream flow by the filamentary pad drips therefrom;

transporting the collected mist in the drainage member to the vicinity of the vessel wall area; and discharging the collected mist in the proximate wall area of the vessel substantially in a second direction following gravity and in parallel with the vessel's vertical axis.

6. A mist eliminator assembly suitable for liquid mist removal from gas plus mist streams comprising a filamentary pad or bed disposed in a vessel through which said gas plus mist stream flows substantially in a first direction opposing gravity, and at least one impermeable liquid drainage member placed substantially perpendicular to the gas plus mist stream flow direction, said drainage member located adjacent to the pad or bed such that said drainage member captures liquid draining from the bottom of said pad or bed, said drainage member extending to the vicinity of the vessel wall, said drainage member transporting and discharging said liquid away from said pad or bed to the vicinity of the vessel wall, said drainage member inducing gas vortex flow downstream of the drainage members, thus enhancing the discharge of liquid at high gas velocities without limitation by re-entrainment of said discharged liquid by said gas plus mist stream flow.

7. A method for removal of mist from a gas plus mist stream comprising the steps of:

introducing a gas plus mist stream flow into a vessel;

passing the gas plus mist stream flow through a filamentary pad to substantially remove the mist from the gas plus mist stream flow;

collecting the mist which has been removed from the gas plus mist stream flow from the lower surface of the filamentary pad in at least one impermeable drainage member under and adjacent to the filamentary pad;

enhancing and augmenting the discharge and capture of liquid draining from the lower surface of the filamentary pad into the drainage member by inducing gas vortex flow downstream of the drainage members;

transporting the collected mist in the drainage member to the vicinity of the vessel wall area; and discharging the collected mist in the proximate wall area of the vessel.

* * * * *

UNITED STATES PATENT AND TRADEMARK OFFICE
CERTIFICATE OF CORRECTION

PATENT NO. : 5,439,510
DATED : August 8, 1995
INVENTOR(S) : Bernard J. Lerner

It is certified that error appears in the above-indentified patent and that said Letters Patent is hereby corrected as shown below:

Column 7, line 67, change "9" to -- 8 --.

Signed and Sealed this

Twenty-sixth Day of December, 1995

Attest:

BRUCE LEHMAN

Attesting Officer     Commissioner of Patents and Trademarks